United States Patent
Lohmann

(10) Patent No.: US 8,698,893 B2
(45) Date of Patent: *Apr. 15, 2014

(54) DEVICE FOR MONITORING AN AREA OF COVERAGE ON A WORK TOOL

(75) Inventor: Lutz Lohmann, Olching (DE)

(73) Assignee: Leuze Lumiflex GmbH & Co. KG, Owen/Teck (DE)

( * ) Notice: Subject to any disclaimer, the term of this patent is extended or adjusted under 35 U.S.C. 154(b) by 2411 days.

This patent is subject to a terminal disclaimer.

(21) Appl. No.: 11/121,103

(22) Filed: May 4, 2005

(65) Prior Publication Data

US 2005/0207619 A1 Sep. 22, 2005

Related U.S. Application Data

(63) Continuation of application No. 11/015,762, filed on Dec. 20, 2004, now abandoned.

(30) Foreign Application Priority Data

Dec. 20, 2003 (DE) .................................. 103 60 174

(51) Int. Cl.
*H04N 7/18* (2006.01)

(52) U.S. Cl.
USPC ........................................................ 348/148

(58) Field of Classification Search
USPC .................................. 348/142, 143–148, 150
IPC ........................................................ H04N 7/18
See application file for complete search history.

(56) References Cited

U.S. PATENT DOCUMENTS

| 5,351,078 A | * | 9/1994 | Lemelson ...................... 348/135 |
| 5,694,203 A | * | 12/1997 | Ogawa .......................... 356/5.04 |
| 6,373,557 B1 | | 4/2002 | Mengel et al. |
| 7,274,438 B2 | * | 9/2007 | Doemens et al. ............ 356/5.04 |
| 7,315,383 B1 | * | 1/2008 | Abdollahi ..................... 356/601 |
| 2003/0123707 A1 | | 7/2003 | Park |

FOREIGN PATENT DOCUMENTS

| DE | 44 14 434 A1 | 11/1995 |
| DE | 195 44 632 A1 | 8/1997 |
| DE | 195 11 990 C2 | 9/1997 |
| DE | 196 19 186 C1 | 1/1998 |
| DE | 196 45 175 A1 | 7/1998 |
| DE | 198 21 974 A1 | 11/1999 |
| DE | 198 33 207 A1 | 2/2000 |
| DE | 100 00 287 A1 | 7/2001 |
| DE | 100 26 306 A1 | 11/2001 |
| EP | 0 087 771 A2 | 11/1998 |
| EP | 1 148 352 A2 | 10/2001 |
| EP | 1 148 353 A2 | 10/2001 |
| EP | 1 168 269 A2 | 1/2002 |
| EP | 1 367 314 A2 | 5/2003 |

* cited by examiner

*Primary Examiner* — Tung Vo

(74) *Attorney, Agent, or Firm* — Venable LLP; Robert Kinberg

(57) ABSTRACT

A device for monitoring an area of coverage on a work tool may comprise a sensor, a camera, an evaluation unit, and at least one circuit output to activate the work tool only if no object is located in the area of coverage. The sensor may comprise a lighting unit to emit light rays to illuminate the area of coverage and a camera to detect three-dimensional images of the area of coverage, where the camera may include receiving elements in a matrix-type arrangement, the receiving elements to generate output signals. The evaluation unit is adapted to measure the output signals, to determine a distance value for each receiving element based on emitted light rays from the lighting unit traveling to the area of coverage and being reflected back.

21 Claims, 4 Drawing Sheets

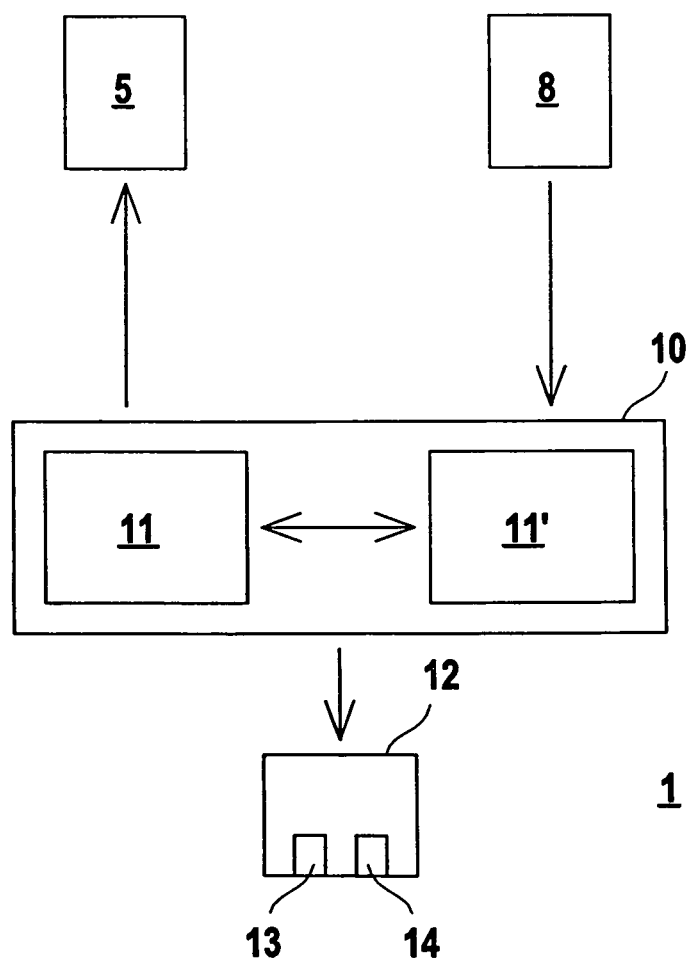

DEVICE FOR MONITORING AN AREA OF COVERAGE ON A WORK TOOL

CROSS-REFERENCE TO RELATED APPLICATIONS

This application is a continuation of U.S. patent application Ser. No. 11/015,762, filed on Dec. 20, 2004, which claims the priority of German Patent Application No. 103 60 174.0-52, filed Dec. 20, 2003, the disclosures of both of which are incorporated herein by reference.

BACKGROUND OF THE INVENTION

The invention relates to a device for monitoring an area of coverage on a work tool.

The work tool can be a mobile system, wherein mobile systems of this type can be transport vehicles such as industrial trucks. With systems of this type, the area of coverage is the area in front of the transport vehicle which must be monitored to avoid collisions with persons or objects. The work tools can furthermore be stationary systems such as machines with machine parts that perform dangerous movements. The area of coverage must, therefore, be dimensioned so as to allow the monitoring of regions where endangering movements are carried out. A robot for assembling work pieces is one example of such a work tool. Assembly robots of this type represent a high potential for danger since the operator in general must insert the work pieces manually at the assembly robot.

Protective devices are normally used for securing such areas of coverage, wherein the protective devices shut down the work tool in case of an uncontrolled operator intervention.

Protective devices of this type in particular can be embodied as two-hand control units. These two-hand control units protect the hands of the operator who must actively engage the levers for starting and maintaining a dangerous movement because the operator must keep both hands on the levers and is thus protected against injuries when operating the work tool. The disadvantage of these devices is that other persons in the area of coverage are not protected.

An additional disadvantage with a work tool embodied as assembly robot is that the assembly robot working cycle decreases, thus unnecessarily restricting its availability.

Safety light curtains are also used as protective devices. A safety light curtain of this type is known, for example, from German patent document DE 39 39 191 C3. These safety light curtains consist of several pairs of transmitters and receivers which respectively form a light barrier. Protective devices of this type are used to cover a planar, two-dimensional area to be monitored.

However, protective devices of this type have the disadvantage that numerous such protective devices are required to completely secure an area of coverage around an assembly robot, particularly with respect to access protection and securing of the area. Not only does this represent an undesirably high expenditure, but it also requires an expensive and involved assembly, wherein the available space for installing these devices is frequently insufficient.

It is a further disadvantage that these types of protective devices are not suitable for monitoring areas of coverage around mobile work tools.

Reference European patent document EP 0 902 402 A2 relates to a method for optically monitoring a space, particularly the area around an elevator door, wherein this space is monitored with a camera. Alternatively, several cameras can also be provided by means of which respectively different segments of the space can be monitored. The camera, or each camera, is embodied as a digital camera and is provided with a camera module, an A/D converter, an evaluation unit, a microprocessor, and an image memory. To monitor the space, the evaluation unit performs a pixel comparison between the gray values of an actual image and the gray values of a reference image. In the process, differences are formed between the gray values of the actual image and the gray values of the reference image. The microprocessor also monitors the operational capacity of the camera by detecting whether a basic brightness of the actual image is exceeded or not reached.

The disadvantage of the above-mentioned invention is that the reference image comparison depends on the environment and is thus subject to interference. External light influences in particular can lead to errors in the object detection.

SUMMARY OF THE INVENTION

It is thus the object of the present invention to create a system which ensures a secure monitoring of an area of coverage around stationary as well as mobile work tools.

This and other objects may be achieved by means of a device for monitoring an area of coverage on a work tool, comprising: a sensor, comprising a lighting unit to emit light rays to illuminate the area of coverage and a camera to detect three-dimensional images of the area of coverage, the camera including receiving elements in a matrix-type arrangement, the receiving elements to generate output signals; an evaluation unit to measure the output signals, to determine a distance value for each receiving element based on emitted light rays from the lighting unit traveling to the area of coverage and being reflected back; and at least one circuit output to activate the work tool only if no object is located in the area of coverage.

One critical advantage of the device according to the invention is that the camera not only supplies two-dimensional surface information of the area to be monitored, but also provides depth information based on the distance measurements carried out. As a result, an object can be detected within the area of coverage without realizing a reference image comparison. In particular, objects positioned in front of a background can be securely detected, wherein the object detection for the most part is independent of environmental influences such as the background composition or external light irradiation.

It is furthermore advantageous if the device according to the invention forms a compact structural module which can be used for monitoring areas of coverage around mobile and stationary work tools. The device according to the invention in particular can be installed on robot arms for covering the danger zone in the area surrounding the robot arm. The device according to the invention furthermore can be installed on transport vehicles, for example, industrial trucks, for monitoring the area in front of these vehicles.

If an intervening object is recorded in the area of coverage, the device according to the invention shuts down the work tool to protect persons and objects. In the simplest case, the work tool is deactivated whenever an object enters the area of coverage. In general, the work tool can be deactivated via the inventive device if an object, or specifically a safety-critical object, is detected anywhere in the area of coverage.

Alternatively, safety-critical zones and non safety-critical zones can also be defined within the area of coverage, wherein only object detections in the non safety-critical zones will not result in deactivation of the work tool. By blanking out such areas, the availability of the work tool is increased because unnecessary shutdowns resulting from object detections in those areas are avoided.

According to one advantageous embodiment of the invention, a distinction is made between safety-critical objects and non safety-critical objects. Non safety-critical objects, for example, can be work pieces to be processed, machine parts, stationary building components, and the like, wherein such non safety-critical objects generally do not result in danger to persons. A deactivation of the work tool resulting from the detection of such non safety-critical objects would represent an unnecessary idle time and thus a reduction in the availability of the work tool.

The contours and, if necessary, also the paths of such non safety-critical objects are advantageously acquired in a learning process. During the operating phase following the learning process, all objects that do not match the acquired non safety-critical objects are then classified as safety-critical objects, so that their detection within the area of coverage results in a deactivation of the work tool. This ensures a maximum degree of safety when monitoring an area of coverage since only the previously acquired, non safety-critical objects do not result in deactivating the work tool entering the area of coverage.

The device according to the invention is used, in particular, for the protection of persons. To meet the required safety level, the sensor unit of the device advantageously has a self-monitoring design, i.e., an automatic error control is executed in the sensor unit. It is advantageous in this case that the sensor unit can have a one-channel design. In contrast, the evaluation unit that is installed downstream of the sensor unit preferably has a two-channel design.

BRIEF DESCRIPTION OF THE DRAWINGS

The invention is explained in the following with the aid of the drawings, in which:

FIG. 2 shows a block wiring diagram associated with the device as shown in FIG. 1;

DETAILED DESCRIPTION OF AN EMBODIMENT

Figure 1:
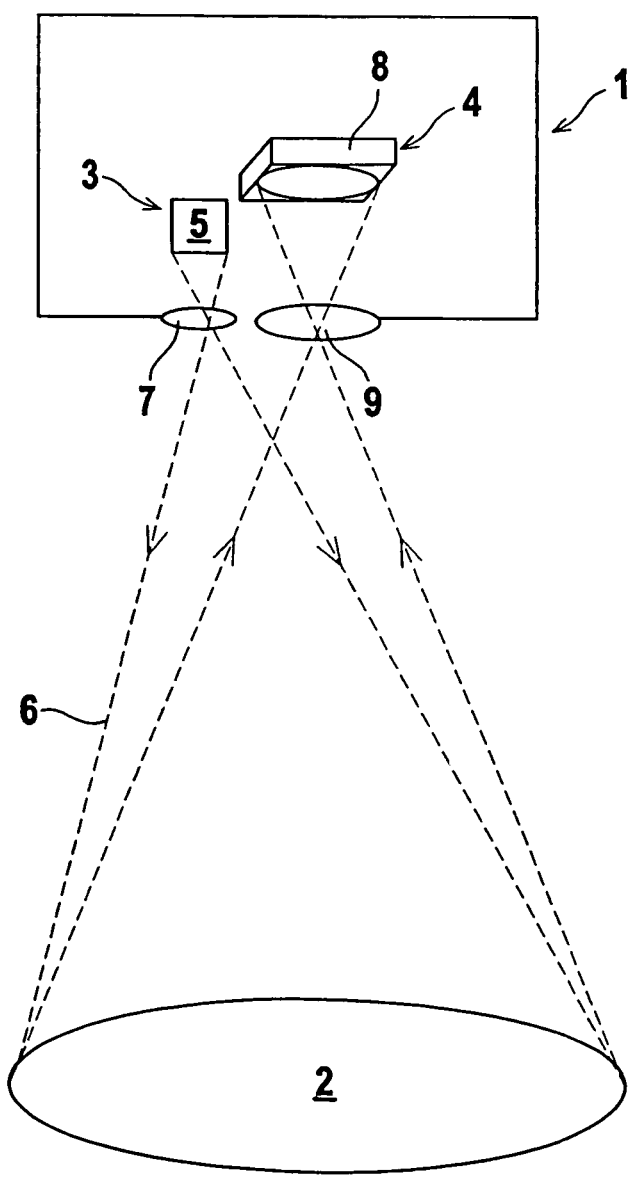
FIG. 1 shows a schematic representation of the optical components of a device for detecting objects.

FIG. 1 schematically shows the optical components of a device 1 for monitoring an area of coverage 2 on a work tool. The work tool, which is not shown in FIG. 1, is a machine, a system, or a vehicle. As a result of operations carried out with this work tool, a danger zone is created in the region of the work tool. The device 1 is used for monitoring the danger zone within the area of coverage 2.

The optical components of the device 1 form a sensor unit, comprising a lighting unit 3 and a camera 4. The lighting unit 3 for the present case is provided with a transmitter 5 in the form of a laser diode which emits light rays 6. Alternatively, the transmitter 5 can also be embodied as light-emitting diode. The lighting device 3 can also consist of arrangements comprising several laser diodes or light-emitting diodes. As a further component, the lighting unit 3 comprises transmitting optics 7, installed downstream of the transmitter 5. The transmitting optics 7 realizes the beam formation of the light rays 6 so that the area of coverage 2 which is to be monitored is completely illuminated by the light rays 6.

The camera 4 comprises receiving elements arranged in particular in a rectangular or square matrix. For the present case, the camera 4 has a CMOS-chip 8 with a rectangular arrangement of receiving elements. Alternatively, the camera 4 can also be provided with a corresponding CCD-chip.

The camera 4 furthermore comprises receiving optics 9, installed upstream of the CMOS-chip 8, wherein the receiving optics 9 focuses the light rays 6 which are reflected back by the area of coverage 2 onto the receiving elements of the CMOS-chip 8.

FIG. 2 shows a block wiring diagram of the device 1 according to FIG. 1. The transmitter 5 for the lighting unit 3, as well as the camera 4, are connected to a two-channel evaluation unit 10, which for the present case consists of two identical computer units 11, 11' that monitor each other.

On the one hand, the evaluation unit 10 activates the lighting unit 3. On the other hand, the evaluation unit 10 evaluates the output signals from the receiving elements in the camera 4. Respectively, one distance value is, therefore, determined continuously for all receiving elements from the transit time for the light rays 6 emitted by the lighting unit 3 and reflected back by the area of coverage 2, to determine three-dimensional images of the area of coverage 2 and/or the objects located in the area of coverage 2.

An output circuit 12 with a circuit output 13 and a warning output 14 is connected to the evaluation unit 10.

A binary switching signal is generated in the evaluation unit 10 in dependence on the evaluation of the output signals from the receiving elements and is emitted via the output 13 for activating or deactivating the work tool. Upon detecting an intervening object in the area of coverage 2, a switching signal state is generated which leads to the work tool being deactivated, i.e., to a shutdown of the work tool. A warning signal is furthermore generated in the evaluation unit 10, if necessary, and is then emitted via the warning output 14.

According to a first variation, the sensor uses a phase-measuring technique for measuring the distance. The phase measuring is realized by imprinting an amplitude modulation with a predetermined modulation frequency onto the light rays 6 emitted by the transmitter 5. To increase the unambiguous range of the phase measuring, and thus the detectable distance range, several amplitude modulations with different modulation frequencies can also be imprinted onto the light rays 6. The phase-measuring operation determines for each receiving element of the CMOS chip 8 the phase difference between the light rays 6 emitted by the transmitter 5 and the light rays 6 after they have been reflected back by the area of coverage 2 onto the receiving elements. From these phase differences, distance values are respectively computed in the evaluation unit 10. Three-dimensional images of objects located in the monitoring area are thus obtained from the total number of all distance values determined for the receiving elements.

According to a second variation, the sensor unit measures the distance with the aid of a pulse transit-time method. The transmitter 5 in that case emits light rays 6 in the form of light pulses, wherein the transit time of each light pulse from the transmitter 5 to the area of coverage 2 and back to the camera 4 is evaluated for each receiving element. Three-dimensional images of objects within the area of coverage 2 are again obtained from the total number of all distance values for the individual receiving elements.

Figures 3A, 3B, 3C, 3D:
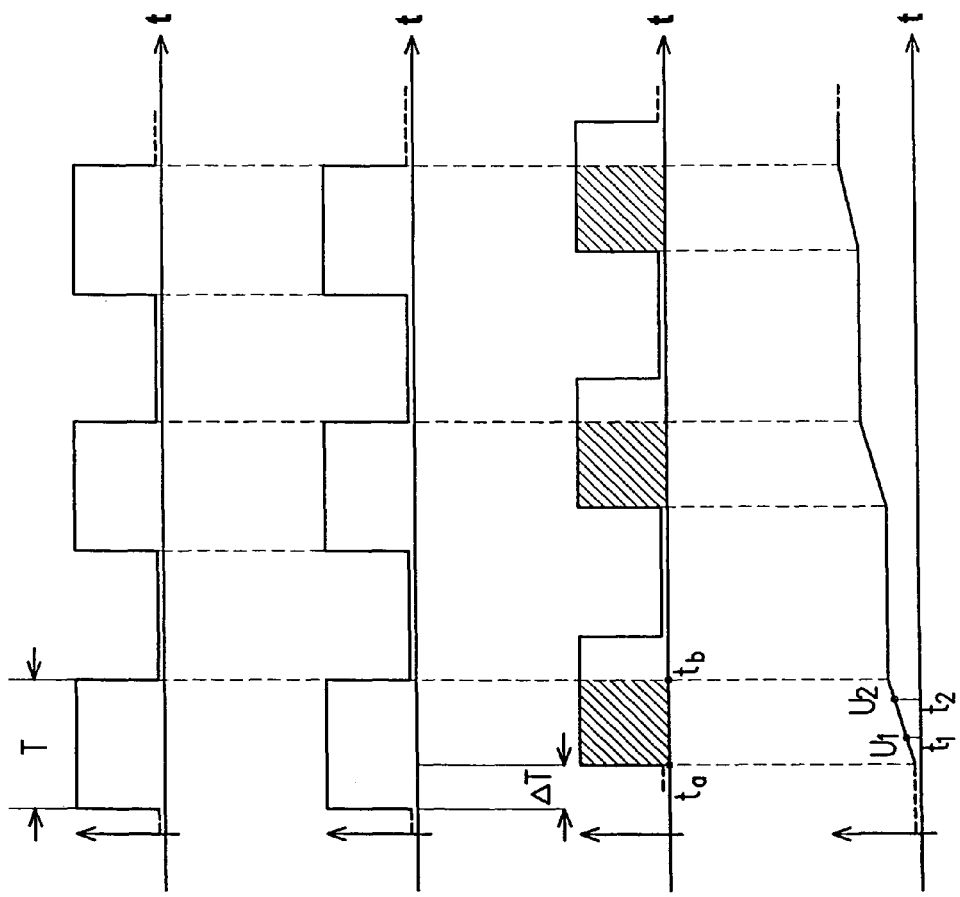
FIG. 3 shows time-interval diagrams for the device according to FIG. 1, for determining the distance with the pulse transit-time method.

FIGS. 3a-3d schematically show the distance measuring principle based on a pulse transit-time method. FIG. 3a shows the sequence of light pulses emitted by the transmitter 5, which are referred to as transmitting light pulses. The transmitting light pulses respectively have the same pulse duration T, wherein the pulse intervals between two transmitting light pulses also remain constant. FIG. 3c shows the light pulses that are referred to as receiving light pulses, wherein these light pulses are emitted by the transmitter 5 and are reflected back onto a receiving element by an object located at distance d to the device 1. Corresponding to the light transit time of a light pulse from the transmitter 5 to the object and back to the receiving element, each receiving light pulse is delayed by the time interval $\Delta T=2d/c$ as compared to the associated transmitting light pulse. In this case, d represents the distance between the object and the device 1, and c represents the speed of light. For the distance determination, the time duration $\Delta T$ in principle can be determined with a counting method. An oscillator-controlled counter in that case is started along with the emission of a transmitting light pulse, which preferably has an ascending edge. The counter is stopped once the associated receiving light pulse is received, preferably also with the ascending edge.

An integration method is used in this case to determine the time duration $\Delta T$. FIG. 3b shows sequences of integration intervals during which the output signal that is generated at the receiving element by the respective receiving light pulse is integrated. As shown in FIG. 3b, the individual integration intervals last for the duration of a transmitting light pulse, meaning the output signal on the receiving element is respectively integrated only during the emission of a transmitting light pulse. Since each receiving light pulse is delayed by $\Delta T$, relative to the associated transmitting light pulse, only a portion of the receiving light pulse falls into the respective integration interval. Accordingly, the output signal for the first receiving light pulse, for example, is integrated only during the time interval between $t_a$ and $t_b$.

The integrated output signal U, obtained in this way, is illustrated in FIG. 3d.

Two measuring points on the integrated output signal are selected within each integration interval for determining $\Delta T$. The position of the measuring points is selected such that these are located in a time interval within which the receiving light pulse has just arrived on the receiving element.

The measuring points $U_1$, $U_2$ at the instants in time $t_1$, $t_2$ are selected for the first integration interval, and $\Delta T$ is then determined from these measuring points with the following equation:

$$\Delta T=(U_2 t_1 - U_1 t_2)/(U_2-U_1).$$

Three-dimensional images of objects are obtained with the aid of the distance measurements realized for the individual receiving elements in the camera 4, wherein these images can be used in particular also to detect objects in front of background areas with optional surface structures.

The device 1, if used for the protection of persons, must meet all requirements of the respective safety level. For this, the evaluation unit 10 has a redundant, two-channel design and is provided with two computer units 11, 11', which mutually monitor each other.

The sensor unit, in particular the camera 4, has a single-channel design. To achieve the required safety level, an automatic error control is realized in the sensor unit, such that it is self-monitoring.

In the event that the device 1 uses a pulse transit time method for measuring the distance, the emission of a transmitting light pulse is delayed at predetermined time intervals, by predetermined time intervals, for realizing the automatic error control. The resulting change in the distance measurement for the individual receiving elements is then checked in the evaluation unit 10.

When measuring the distance with a phase measuring method, the phase of the amplitude modulation imprinted on the light rays 6 is correspondingly displaced, and the resulting change in the distance measurement is checked for the individual receiving elements.

During the object detection with the device 1, a switching signal for deactivating the work tool can, in general, be generated in the evaluation unit 10 if an arbitrary object is detected in the area of coverage 2.

Alternatively, it is possible to differentiate between safety-critical objects and non safety-critical objects with the device 1, wherein only safety-critical objects entering the area of coverage 2 result in deactivation of the work tool.

Non safety-critical objects of this type can be machine parts, for example, particularly parts of work tools, work pieces to be processed with the work tool, or even stationary parts such as building components. In general, if a non safety-critical object of this type enters the area of coverage 2, it does not result in danger and especially not in danger to persons.

To avoid an unnecessary shutdown of the work tool when a non safety-critical object enters the area of coverage 2, the contours and, if necessary, also the paths of non safety-critical objects, provided the objects always move along those paths, are acquired during a learning process and the data stored in the evaluation unit 10.

Objects detected in the area of coverage 2 during the subsequent operation of the device 1, and if applicable, also their paths, are then compared in the evaluation unit 10 to the stored, non safety-critical objects. If it is determined that the detected object does not match the non safety-critical object, then the detected object is classified as a safety-critical object, and a switching signal is generated for deactivating the work tool.

The device 1 can be arranged on stationary and, in particular, also on mobile work tools for securing danger zones in the region of these work tools. For example, the device 1 can be arranged on a robot arm. In that case, the robot represents the work tool, and the danger to persons is caused by the robot arm movements.

Figure 4:
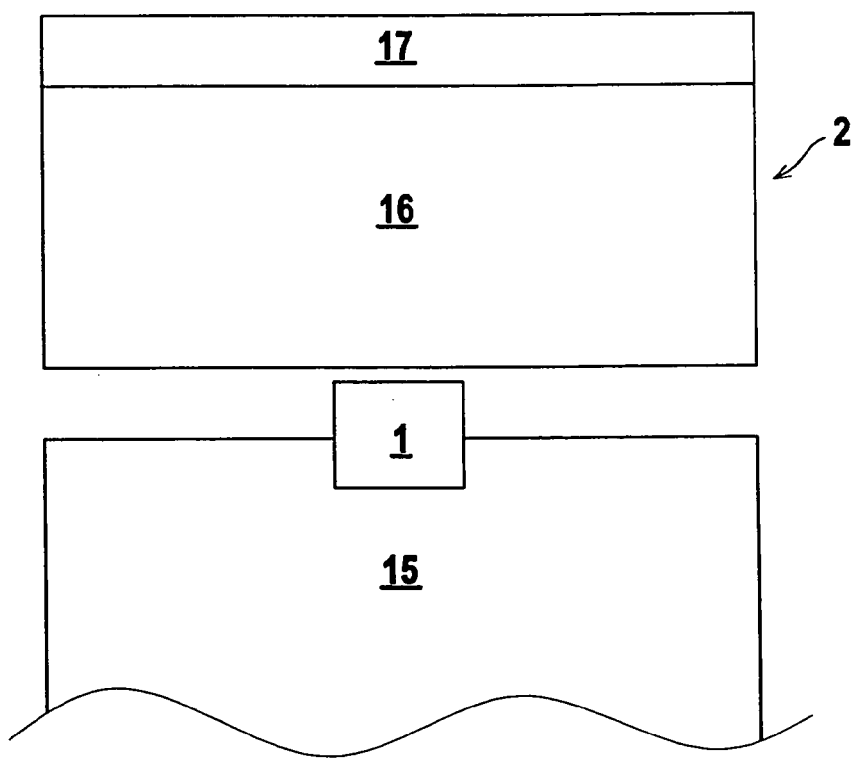
FIG. 4 shows a device according to FIGS. 1 and 2, arranged on an industrial vehicle.

FIG. 4 schematically shows the device 1 installed on a work tool embodied as industrial vehicle 15, wherein the device 1 is attached to the front of the industrial vehicle 15. For this, the device 1 monitors an area of coverage 2 in front of the industrial vehicle 15. The device 1 functions to prevent collisions between the industrial vehicle 15 and persons or objects. A switching signal for stopping the industrial vehicle 15, i.e., for deactivating the work tool, can in principle be generated in the device 1 if any object or a safety-critical object is detected in the area of coverage 2.

For the exemplary embodiment, the area of coverage 2 is divided into a safety zone 16 and a non safety-critical area, wherein this area is a warning zone 17 for the present case. In general, the area of coverage 2 can also be divided into several safety zones 16 and/or non safety-critical areas.

A switching signal for deactivating the work tool is generated only if an object, or respectively, a safety-critical object, is detected in a safety zone 16 within the area of coverage 2. However, the work tool is not deactivated if an object enters a non safety-critical area.

For the present case, the non safety-critical area is configured as warning zone 17, meaning a warning signal is generated and output via the warning output 14 if an object enters the warning zone 17.

FIG. 4 shows that the safety zone 16 covers the area directly in front of the industrial vehicle 15, while the non safety-critical area 17 covers great distances up to the safety zone 16, which takes into consideration the fact that persons located directly in front of the vehicle are in danger.

According to one advantageous embodiment, the area of coverage 2 is divided into the safety zone 16 and the warning zone 17 in dependence on the speed of the industrial vehicle 15, wherein the size of the safety zone relative to the warning zone 17 increases proportional to the increase in the vehicle speed.

In general, the safety zone 16 and the non safety-critical areas can be defined in dependence on external sensors, so-called muting sensors.

The safety zones 16 and the non safety-critical areas can furthermore be defined as blanked-out zones, so-called blanking regions, in dependence on the positions of safety-critical objects or non safety-critical objects, particularly in dependence on predetermined paths for objects of this type.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A device for monitoring an area of coverage on a work tool, comprising:
 a sensor, comprising:
  a lighting unit to emit light rays to illuminate the area of coverage; and
  a camera to detect three-dimensional images of the area of coverage, the camera including receiving elements in a matrix-type arrangement, the receiving elements to generate output signals;
  an evaluation unit to measure the output signals, to determine a distance value for each receiving element based on emitted light rays from the lighting unit traveling to the area of coverage and being reflected back; and
  at least one circuit output to activate the work tool only if no object is located in the area of coverage,
  wherein the sensor unit has a single-channel design,
  wherein the sensor determines distance on the basis of a pulse transit-time method,
  wherein the sensor further includes an automatic error control mechanism, and
  wherein the automatic error control mechanism delays light pulses transmitted by the lighting unit by predetermined time intervals and the evaluation unit evaluates the resulting changed distance values of the output signals generated by the receiving elements to determine whether the sensor is operating free of errors.

2. The device according to claim 1, wherein the camera is provided with a device selected from the group consisting of a CCD chip and a CMOS chip, the chip having a rectangular or square arrangement of receiving elements.

3. The device according to claim 1, wherein the lighting unit comprises:
 at least one transmitter to emit light rays; and
 transmitting optics, arranged downstream of the transmitter, to focus the light rays on the area of coverage.

4. The device according to claim 3, wherein the transmitter of the lighting unit comprises at least one of the group consisting of a light-emitting diode and a laser diode.

5. The device according to claim 1, wherein the transmitter emits light rays in the form of light pulses.

6. The device according to claim 1, wherein the evaluation unit distinguishes between safety-critical objects and non safety-critical objects and sends an activating signal only if no safety-critical object is located in the coverage area.

7. The device according to claim 6, wherein the evaluation unit discriminates between non safety-critical and safety-critical objects based on stored data obtained via a learning process.

8. The device according to claim 7, wherein the stored data includes contours of non safety-critical objects.

9. The device according to claim 7, wherein the stored data includes path movements of non safety-critical objects.

10. The device according to claim 1, wherein the area of coverage includes at least one safety zone and at least one non safety-critical area, and wherein the circuit output is adapted to activate the work tool only when no objects are detected in the safety zone.

11. The device according to claim 10, wherein at least a portion of the non safety-critical area includes a warning zone, and wherein the evaluation unit generates a warning signal if an object is detected in the warning zone.

12. The device according to claim 10, wherein the non safety-critical areas are defined in dependence on the positions of either safety-critical or non safety-critical objects within the area of coverage.

13. The device according to claim 10, wherein the at least one non safety-critical area is defined in dependence on signals from one or more external sensors.

14. The device according to claim 1, wherein the evaluation unit has a two-channel design.

15. The device according to claim 14, wherein the evaluation unit comprises two computer units that mutually monitor each other.

16. A mobile work arrangement comprising:
 a mobile work tool; and
 the device according to claim 1,
 wherein the device is positioned to monitor an area of coverage in front of the mobile work tool.

17. A device for monitoring an area of coverage on a work tool, comprising:
 a sensor, comprising:
  a lighting unit to emit light rays to illuminate the area of coverage; and
  a camera to detect three-dimensional images of the area of coverage, the camera including receiving elements in a matrix-type arrangement, the receiving elements to generate output signals;
  an evaluation unit to measure the output signals, to determine a distance value for each receiving element based on emitted light rays from the lighting unit traveling to the area of coverage and being reflected back; and
  at least one circuit output to activate the work tool only if no object is located in the area of coverage,
  wherein the sensor unit has a single-channel design
  wherein the sensor determines distance based on a phase-measuring method,
  wherein the sensor further includes an automatic error control mechanism, and
  wherein the automatic error control mechanism displaces a phase of an amplitude modulation imprinted on the light rays emitted by the lighting unit and the evaluation unit evaluates the resulting changed distance values of the output signals generated by the receiving elements to determine whether the sensor is operating free of errors.

18. The device according to claim 17, wherein the transmitter emits light rays that are imprinted with an amplitude modulation having at least one predetermined modulation frequency.

19. The device according to claim 17, wherein the evaluation unit distinguishes between safety-critical objects and non safety-critical objects and sends an activating signal only if no safety-critical object is located in the coverage area.

20. The device according to claim 17, wherein the evaluation unit has a two-channel design.

21. The device according to claim 20, wherein the evaluation unit comprises two computer units that mutually monitor each other.

* * * * *